United States Patent
Matsumura

(10) Patent No.: US 10,970,572 B2
(45) Date of Patent: *Apr. 6, 2021

(54) DRIVER CONDITION DETECTION SYSTEM

(71) Applicant: Toyota Jidosha Kabushiki Kaisha, Toyota (JP)

(72) Inventor: Takeshi Matsumura, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,879

(22) Filed: Aug. 6, 2020

(65) Prior Publication Data

US 2020/0381242 A1 Dec. 3, 2020

Related U.S. Application Data

(63) Continuation of application No. 15/891,455, filed on Feb. 8, 2018, now Pat. No. 10,769,460.

(30) Foreign Application Priority Data

Feb. 8, 2017 (JP) .............................. JP2017-021185

(51) Int. Cl.
*G06K 9/00* (2006.01)
*B60W 40/08* (2012.01)
(Continued)

(52) U.S. Cl.
CPC ......... *G06K 9/00845* (2013.01); *B60W 40/08* (2013.01); *G06K 9/00281* (2013.01);
(Continued)

(58) Field of Classification Search
CPC combination set(s) only.
See application file for complete search history.

(56) References Cited

U.S. PATENT DOCUMENTS

| 5,859,921 A | 1/1999 | Suzuki | |
| 5,926,251 A * | 7/1999 | Okumura | A61B 3/113 351/209 |

(Continued)

FOREIGN PATENT DOCUMENTS

| DE | 10 2006 059 172 A1 | 11/2007 |
| JP | 3093959 U | 5/2003 |

(Continued)

OTHER PUBLICATIONS

U.S. Appl. No. 15/870,485, filed Jan. 12, 2018; Inventor: Takeshi Matsumura.

(Continued)

*Primary Examiner* — Zhiyu Lu
(74) *Attorney, Agent, or Firm* — Dinsmore & Shohl LLP

(57) ABSTRACT

The driver condition detection system includes a driver monitor camera capturing a face of a driver of a vehicle and generating a facial image of the driver, and a driver condition detection part configured to detect a condition of the driver based on the facial image. If a part of face parts of the driver is hidden in the facial image, the driver condition detection part is configured to detect a condition of the driver based on face parts of the driver not hidden in the facial image. The face parts of the driver are a mouth, nose, right eye, and left eye of the driver.

4 Claims, 5 Drawing Sheets

(51) Int. Cl.
*H01J 49/00* (2006.01)
*H01J 49/40* (2006.01)

(52) U.S. Cl.
CPC ...... *G06K 9/00288* (2013.01); *H01J 49/0086* (2013.01); *H01J 49/403* (2013.01)

(56) References Cited

U.S. PATENT DOCUMENTS

| | | | | |
|---|---|---|---|---|
| 6,496,594 | B1* | 12/2002 | Prokoski | A61B 5/1176 382/118 |
| 10,706,299 | B2* | 7/2020 | Matsumura | B60W 50/12 |
| 2007/0014431 | A1* | 1/2007 | Hammoud | G06K 9/00604 382/103 |
| 2007/0147661 | A1 | 6/2007 | Fukaya et al. | |
| 2007/0192038 | A1 | 8/2007 | Kameyama | |
| 2008/0166052 | A1 | 7/2008 | Hatano | |
| 2008/0231703 | A1* | 9/2008 | Nagata | H04N 7/181 348/148 |
| 2009/0279786 | A1* | 11/2009 | Kasugai | G06K 9/00248 382/195 |
| 2010/0007480 | A1* | 1/2010 | Uozumi | B60W 40/09 340/436 |
| 2012/0161954 | A1* | 6/2012 | Liao | G06K 9/00845 340/439 |
| 2013/0101224 | A1* | 4/2013 | Ueki | G06K 9/00268 382/195 |
| 2013/0230217 | A1* | 9/2013 | Ueki | G06K 9/00268 382/118 |
| 2014/0139655 | A1 | 5/2014 | Mimar | |
| 2016/0001781 | A1 | 1/2016 | Fung et al. | |
| 2016/0314366 | A1 | 10/2016 | Omi | |
| 2017/0140232 | A1 | 5/2017 | Banno et al. | |
| 2017/0155867 | A1 | 6/2017 | Yokota et al. | |
| 2018/0201276 | A1 | 7/2018 | Matsumura | |
| 2018/0204079 | A1* | 7/2018 | Matsumura | B60W 50/12 |
| 2019/0135295 | A1 | 5/2019 | Sato et al. | |

FOREIGN PATENT DOCUMENTS

| | | |
|---|---|---|
| JP | 2003-308533 A | 10/2003 |
| JP | 2008-037218 A | 2/2008 |
| JP | 2009-279186 A | 12/2009 |
| JP | 2011-253547 A | 12/2011 |
| JP | 2014-19301 A | 2/2014 |
| JP | 2016-57839 A | 4/2016 |
| WO | 2015198542 A1 | 12/2015 |

OTHER PUBLICATIONS

Non-Final Office Action dated May 23, 2019 in U.S. Appl. No. 15/870,485.
Ueno, Hiroshi et al., "Development of drowsiness detection system", IEEE, Vehicle Navigation & Information Systems Conference Proceedings, 1994, p. 15-20.
Takahashi, Hiroshi, "Various perspectives for driver support systems in Japan", IEEE, 2012, p. 1627-1632.
Shen, Jian et al., "A novel sensors-based and multiple warning early fatigue detection system architecture", IEEE, 2015 First International Conference on Computational Intelligence Theory, Systems and Applications, 2015, p. 193-196.
Itoh, Michimasa et al., "Driver's status monitor", IEEE, Proceedings of the 21st International Conference on Data Engineering, 2005.
Mizuno, Nobuhiro et al., "Detecting driver's visual attention area by using vehicle-mounted device", IEEE, 16th Int'l Conf. on Cognitive Informatics & Cognitive Computing, 2017, p. 346-352.
Saito, Yuichi et al., "Driver assistance system with a dual control scheme: effectiveness of identifying driver drowsiness and preventing lane departure accidents", IEEE Transactions on Human-Machine Systems, vol. 46, No. 5, Oct. 2016, p. 660-671.
Singh, Hardeep et al., "Eye tracking based driver fatigue monitoring and warning system", IEEE, 2011.
Fletcher, Luke et al. ,"Vision in and out of vehicles", IEEE Intelligent Systems, 2003, p. 12-17.
Notice of Allowance dated Sep. 18, 2019 in U.S. Appl. No. 15/870,485.

* cited by examiner

DRIVER CONDITION DETECTION SYSTEM

CROSS-REFERENCE TO RELATED APPLICATIONS

This application is a continuation patent application of U.S. patent application Ser. No. 15/891,455 filed Feb. 8, 2018, which claims priority to Japanese Patent Application No. 2017-021185 filed Feb. 8, 2017, both of which are incorporated herein by reference in their entirety including the specification, drawings, and abstract.

TECHNICAL FIELD

The present disclosure relates to a driver condition detection system.

BACKGROUND ART

Known in the past has been a device using an image capturing means provided in a vehicle for detecting a condition of a driver of the vehicle. For example, Japanese Patent Publication No. 2016-057839A describes that a facial direction of the driver and an angular velocity of the facial direction is calculated from an image of the driver captured by the image capturing means and, if the facial direction of the driver is outside an image capturing range of the image capturing means, the facial direction is estimated based on the angular velocity of the facial direction.

SUMMARY

Technical Problem

However, even if the facial direction of the driver is within the image capturing range of the image capturing means, sometimes a part of the face parts of the driver will be hidden in the facial image of the driver, and the precision of detection of the driver condition will fall. For example, if a steering wheel is positioned between the image capturing means and the driver, when the turning amount of the steering wheel becomes greater, face parts of the driver will be hidden behind the spoke parts etc., of the steering wheel. Further, sometimes face parts of the driver will be hidden by the hands or arms etc., of the driver.

Therefore, an object of the present disclosure is to provide a driver condition detection system which can suppress a drop in the precision of detection of the driver condition due to a part of the face parts of the driver being hidden in the facial image of the driver.

Solution to Problem

The summary of the present disclosure is as follows.

(1) A driver condition detection system comprising: a driver monitor camera capturing a face of a driver of a vehicle and generating a facial image of the driver, and a driver condition detection part configured to detect a condition of the driver based on the facial image, wherein if a part of face parts of the driver is hidden in the facial image, the driver condition detection part is configured to detect a condition of the driver based on face parts of the driver not hidden in the facial image, the face parts of the driver being a mouth, nose, right eye, and left eye of the driver.

(2) The driver condition detection system described in above (1), wherein the condition of the driver is a facial direction of the driver.

(3) The driver condition detection system described in above (2), wherein if a part of the face parts of the driver is hidden in the facial image, the driver condition detection part is configured to detect the facial direction of the driver based on the face parts of the driver not hidden in the facial image and the facial image before a part of the face parts of the driver is hidden.

(4) The driver condition detection system described in above (3), wherein the driver condition detection part is configured to judge that the facial direction of the driver has not changed from before a part of the face parts of the driver was hidden if an amount of change of a condition of the face parts of the driver not hidden in the facial image is a threshold value or less, and not detect the facial direction of the driver if the amount of change is larger than the threshold value.

(5) The driver condition detection system described in above (3), wherein the driver condition detection part is configured to judge that the facial direction of the driver has not changed from before a part of the face parts of the driver was hidden if an amount of change of a position and size of the face parts of the driver not hidden in the facial image is a threshold value or less, and not detect the facial direction of the driver if the amount of change of at least one of the position and size is larger than the threshold value.

(6) The driver condition detection system described in any one of above (2) to (5), wherein the driver condition detection part is configured to perform matching of the facial image and facial shape data to detect the facial direction of the driver.

(7) The driver condition detection system described in above (6), wherein the driver condition detection part is configured to perform matching of face parts in the facial image and face parts in the facial shape data to detect the facial direction of the driver.

(8) The driver condition detection system described in above (7), wherein the driver condition detection part is configured not to perform matching of the face parts of the driver hidden in the facial image and face parts in the facial shape data if a part of the face parts of the driver is hidden in the facial image.

Advantageous Effects

According to the present disclosure, it is possible to improve the response when raising the mechanical compression ratio in a variable compression ratio internal combustion engine provided with a variable compression ratio mechanism.

DESCRIPTION OF EMBODIMENTS

Figure 1:
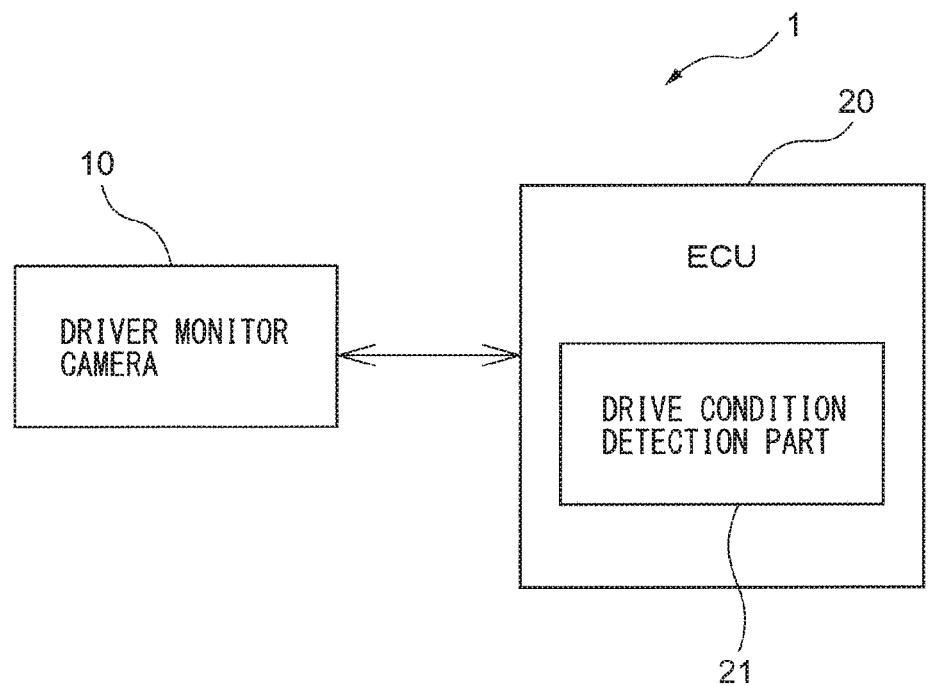
FIG. 1 is a block diagram showing the configuration of a driver condition detection system according to a first embodiment of the present disclosure.

Below, referring to the drawings, embodiments of the present disclosure will be explained in detail. Note that, in the following explanation, similar component elements are assigned the same reference numerals.

First Embodiment

Below, referring to FIG. 1 to FIG. 6, a first embodiment of the present disclosure will be explained. FIG. 1 is a block diagram showing the configuration of a driver condition detection system according to the first embodiment of the present disclosure. The driver condition detection system 1 is mounted in a vehicle and detects the condition of the driver of the vehicle. The driver condition detection system 1 is provided with a driver monitor camera 10 and electronic control unit (ECU) 20.

Figure 2:
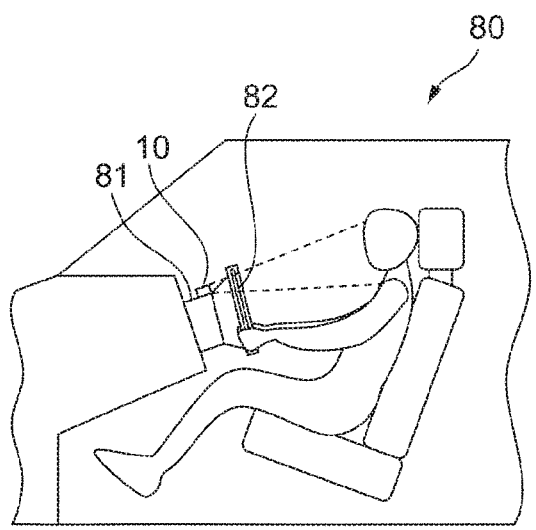
FIG. 2 is a view schematically showing an inside of a vehicle mounting a driver condition detection system.

FIG. 2 is a view schematically showing the inside of a vehicle mounting a driver condition detection system. The driver monitor camera 10 captures a face of the driver of the vehicle 80 to generate a facial image of the driver. The driver monitor camera 10 is provided inside the vehicle. Specifically, as shown in FIG. 2, the driver monitor camera 10 is provided at the top of a steering wheel column 81 of the vehicle 80. FIG. 2 shows a range of projection of the driver monitor camera 10 by broken lines. Note that, the driver monitor camera 10 may be provided at instrument panel, instrument panel hood, etc., of the vehicle 80.

The driver monitor camera 10 is comprised of a camera and projector. For example, the camera is a CMOS (complementary metal oxide semiconductor) camera or CCD (charge coupled device) camera, while the projector is an LED (light emitting diode). Further, in order to enable the face of the driver to be captured without making the driver uncomfortable even during other low luminance time such as night, etc., the projector may be a near-infrared LED. For example, the projector is two near-infrared LEDs arranged at the two sides of the camera. Further, the camera may be provided with a filter such as a visible light cutting filter. The facial image of the driver generated by the driver monitor camera 10 is transmitted from the driver monitor camera 10 to the ECU 20.

The ECU 20 is a microcomputer provided with components connected with each other by bidirectional buses such as a central processing unit (CPU), read only memory (ROM), random access memory (RAM), input port, and output port. In the present embodiment, one ECU 20 is provided, but a plurality of ECUs may be provided for the different functions. The ECU 20 includes a driver condition detection part 21 detecting the condition of the driver based on the facial image of the driver generated by the driver monitor camera 10.

As shown in FIG. 2, the steering wheel 82 is positioned between the driver monitor camera 10 and the driver. In this case, the driver monitor camera 10 captures the driver through the steering wheel 82. For this reason, when the turning amount of the steering wheel 82, that is, the steering angle of the steering wheel 82, becomes larger, the spoke parts etc., of the steering wheel 82 will obstruct the capture of the driver.

Specifically, if turning the steering wheel 82 to the right (clockwise) seen from the driver's side, along with the increase of the turning amount, the face parts of the driver will be hidden by the steering wheel 82 in the order of the mouth, nose, left eye, and right eye. On the other hand, if turning the steering wheel 82 to the left (counterclockwise) seen from the driver's side, along with the increase of the turning amount, the face parts of the driver will be hidden by the steering wheel 82 in the order of the mouth, nose, right eye, and left eye.

Further, sometimes a hand or arm etc., of the driver will cause face parts of the driver to be hidden. For this reason, even when the facial direction of the driver is in the image capturing range of the driver monitor camera 10, sometimes a part of the face parts of the driver will be hidden in the facial image of the driver, and the precision of detection of the driver condition will fall.

Therefore, in the present embodiment, when a part of the face parts of the driver (mouth, nose, right eye, and left eye) is hidden in the facial image of the driver, the driver condition detection part 21 detects the condition of the driver based on the face parts of the driver not hidden in the facial image of the driver. Due to this, even when a part of the face parts of the driver is hidden in the facial image of the driver, it becomes possible to detect the condition of the driver. Therefore, it is possible to suppress a drop in the precision of detection of the driver condition due to a part of the face parts of the driver being hidden in the facial image of the driver.

Figure 3:
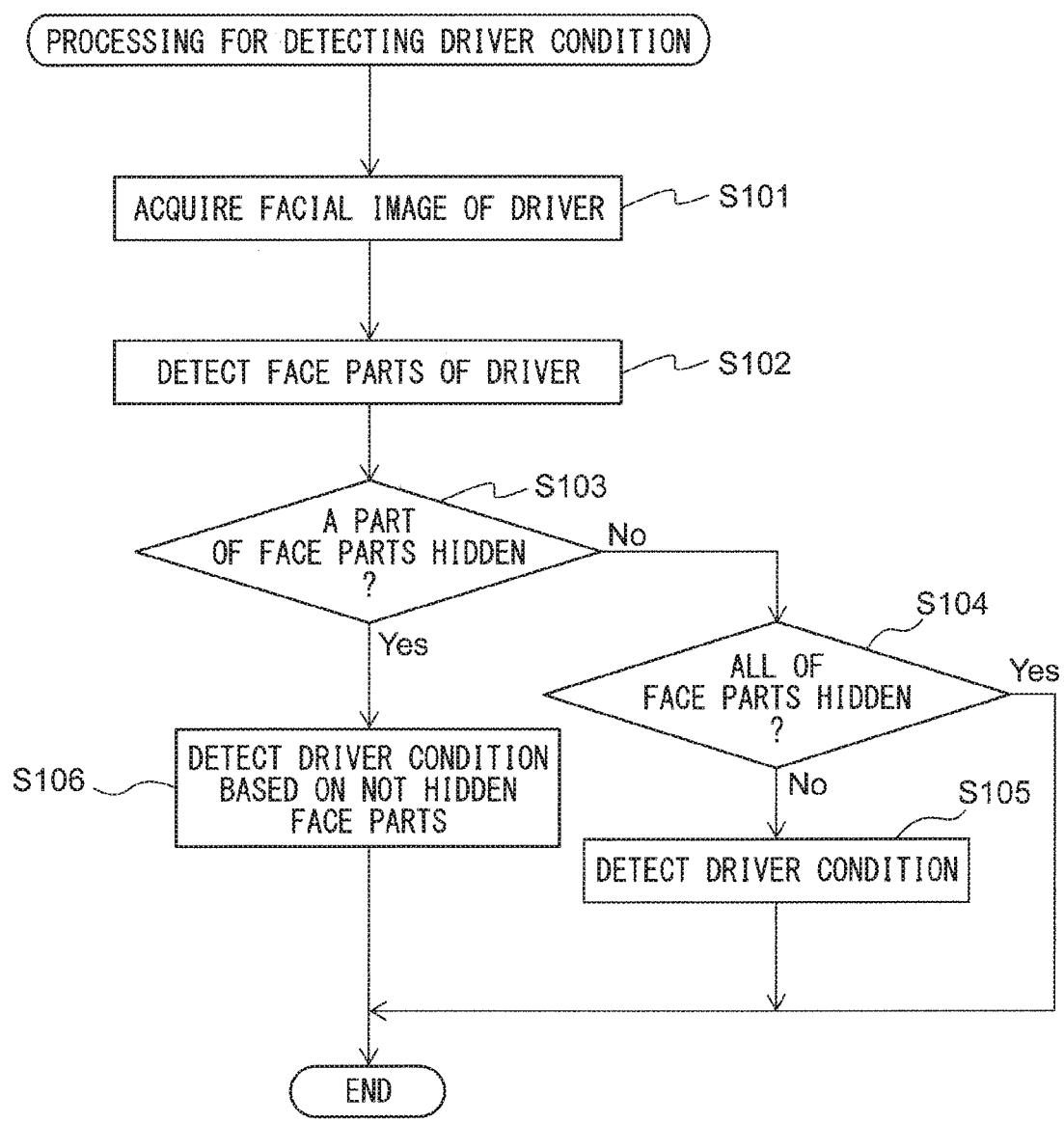
FIG. 3 is a flow chart showing a control routine for processing for detecting a driver condition in the first embodiment.

Below, referring to the flow chart of FIG. 3, control performed by the driver condition detection system 1 will be explained in detail. FIG. 3 is a flow chart showing a control routine of processing for detecting the condition of the driver in the first embodiment. The present control routine is repeatedly performed by the ECU 20. In the present control routine, the condition of the driver of the vehicle 80 is detected.

First, at step S101, the driver condition detection part 21 acquires the facial image of the driver from the driver monitor camera 10. The facial image of the driver is generated by the driver monitor camera 10.

Next, at step S102, the driver condition detection part 21 detects the face parts (mouth, nose, right eye, and left eye) of the driver from the facial image of the driver acquired at step S101. For example, the driver condition detection part 21 identifies the facial region from the facial image of the driver, and detects the mouth, nose, right eye, and left eye by extracting feature points of the mouth, nose, right eye, and left eye. If the feature points of the face parts are not extracted, the face parts are not detected.

Next, at step S103, the driver condition detection part 21 judges whether a part of the face parts of the driver is hidden in the facial image of the driver. For example, the driver condition detection part 21 judges that a part of the face parts of the driver is hidden if it is not possible to detect a part of the face parts of the driver.

If at step S103 it is judged that a part of the face parts is not hidden, the control routine proceeds to step S104. At step S104, the driver condition detection part 21 judges whether all of the face parts of the driver are hidden in the facial image of the driver. For example, the driver condition detection part 21 judges that all of the face parts of the driver are hidden if it is not possible to detect the mouth, nose, right eye, and left eye of the driver.

If at step S104 it is judged that all of the face parts are not hidden, the control routine proceeds to step S105. At step S105, the driver condition detection part 21 detects the driver condition. Specifically, the driver condition detection part 21 detects the degrees of eye opening and facial direction of the driver. For example, the driver condition detection part 21 extracts feature points of the top eyelids and bottom eyelids of the right eye and the left eye to detect the degrees of eye opening of the both eyes.

Further, the driver condition detection part 21, for example, detects the facial direction of the driver by the following method. The driver condition detection part 21 detects the facial direction of the driver by performing matching of the facial image of the driver and facial shape data. The facial shape data is, for example, 3D facial shape data. The driver condition detection part 21 stores in advance the facial shape data when the driver is facing the front, that is, when the facial direction of the driver is 0°. The facial shape data may be data of the facial shape of a standard person or may be acquired for each driver. The facial shape data is, for example, stored in the ROM or RAM of the ECU 20. Further, the driver condition detection part 21 generates facial shape data when the facial direction of the driver changes based on the facial shape data when the driver is facing the front.

Figure 4:
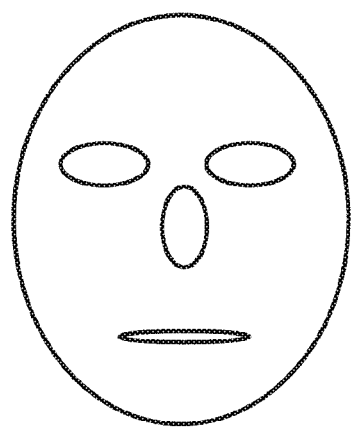
FIG. 4 is a view schematically showing facial shape data when a facial direction of the driver is 0°.
Figure 5:
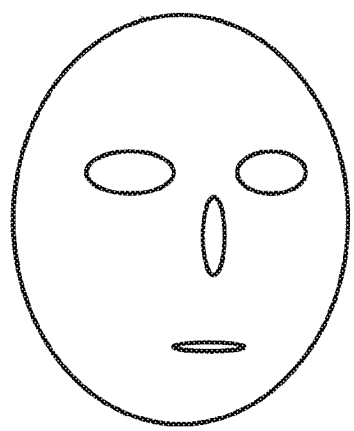
FIG. 5 is a view schematically showing facial shape data when a facial direction of the driver is 10°.

FIG. 4 is a view schematically showing the facial shape data when the facial direction of the driver is 0°. FIG. 5 is a view schematically showing the facial shape data when the facial direction of the driver is 10°. The driver condition detection part 21 performs matching of the face parts in the facial image of the driver and the face parts in the facial shape data, and detects the facial direction of the facial shape data when the rate of match of the two becomes maximum as the facial direction of the driver. Note that, the driver condition detection part 21 may detect the facial direction of the driver from the positional relationship of the face region and the face parts (mouth, nose, right eye, and left eye).

After step S105, the present control routine is ended. On the other hand, if at step S104 it is judged that all of the face parts are hidden, the present control routine is ended. In this case, the driver condition detection part 21 does not detect the driver condition.

Further, if at step S103 it is judged that a part of the face parts is hidden, the control routine proceeds to step S106. At step S106, the driver condition detection part 21 detects the driver condition based on the face parts of the driver not hidden in the facial image of the driver. For example, if the mouth, nose, and right eye of the driver are hidden, the driver condition detection part 21 detects the degree of eye opening and facial direction of the driver based on the left eye of the driver. Specifically, the driver condition detection part 21 extracts the feature points of the top eyelid and bottom eyelid of the left eye to detect the degree of eye opening of the left eye. Further, the driver condition detection part 21 performs matching of the left eye in the facial image of the driver and the left eye in the facial shape data, and detects the facial direction of the facial shape data when the rate of match of the two becomes maximum as the facial direction of the driver. Note that, if the both eyes of the driver are hidden, the driver condition detection part 21 does not detect the degrees of eye opening of the eyes of the driver.

Figure 6:
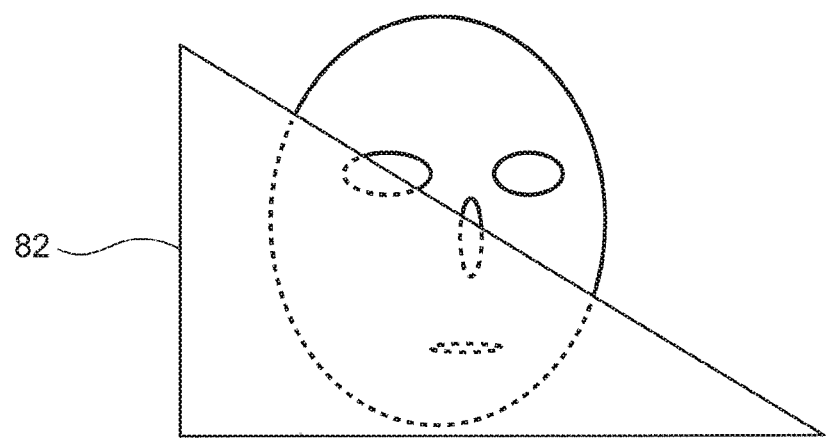
FIG. 6 shows a facial image of the driver, and matching results of the facial image and facial shape data when the facial direction is 10°.

FIG. 6 shows the facial image of the driver and the matching results of the facial image and facial data when a facial direction is 10°. In the facial image shown in FIG. 6, the mouth, nose, and right eye of the driver are hidden by the steering wheel 82. In this example, the rate of match of the left eye when the facial direction of the facial shape data is 10° becomes maximum. For this reason, the facial direction of the driver is calculated as 10°. On the other hand, the rate of match of the mouth, noise, and right eye is less than 50%. However, since the mouth, nose, and right eye are not used for detection of the facial direction of the driver, the facial direction of the driver can be detected. Note that, in this example, although the rates of match of the mouth, nose, and right eye hidden by the steering wheel 82 are calculated, the rates of match of these may not be calculated. That is, the driver condition detection part 21 need not perform matching for the face parts of the driver hidden in the facial image of the driver and face parts in the facial shape data if a part of the face parts of the driver is hidden in the facial image of the driver. Due to this, it is possible to reduce the processing load of the driver condition detection part 21.

After step S106, the present control routine is ended. Note that, at step S103, the driver condition detection part 21 may perform matching of the facial image of the driver and the facial shape data of the angle of each facial direction, and if the rate of match of the face part is less than a predetermined value at all of the angles of facial direction, judge that this face part is hidden. The predetermined value is for example 50%.

Further, if the detected degree of eye opening of an eye of the driver is a predetermined value or less, the driver condition detection part 21 may judge that the driver is dozing off and issue a warning to the driver. Similarly, if the detected facial direction of the driver is outside a predetermined range, the driver condition detection part 21 may judge that the driver is looking aside and issue a warning to the driver. For example, the driver condition detection part 21 may issue a warning to the driver visually or acoustically through a human-machine interface (HMI) provided at the vehicle 80. The HMI is an interface for inputting and outputting information between the driver and the vehicle 80. The HMI is, for example, comprised of a display for displaying text or image information, a speaker for generating sound, operating buttons for the driver to perform an entry operation, a touch panel, microphone, etc.

Second Embodiment

The constitution and control of the driver condition detection system according to the second embodiment are basically similar to the constitution and control of the driver condition detection system according to the first embodiment except for the points explained below. For this reason, below, the second embodiment of the present disclosure will be explained focusing on parts different from the first embodiment.

For example, if many face parts are hidden in the facial image of the driver, it is difficult to detect small changes in the facial direction of the driver based on the not hidden face parts. On the other hand, it is possible to detect the accurate facial direction of the driver before the face parts of the driver are hidden. For this reason, in the second embodiment, if a part of the face parts of the driver is hidden in the facial image of the driver, the driver condition detection part 21 detects the facial direction of the driver based on face parts of the driver not hidden in the facial image of the driver and the facial image of the driver before a part of the face parts of the driver is hidden.

If the facial direction of the driver does not change after a part of the face parts of the driver is hidden, the positions and sizes of the face parts not hidden in the facial image of the driver will not change much at all. For this reason, if the amount of change of the condition of the face parts of the driver not hidden in the facial image of the driver is a threshold value or less, the driver condition detection part 21 judges that the facial direction of the driver has not changed from before a part of the face parts of the driver was hidden.

On the other hand, if the amount of change is larger than the threshold value, the driver condition detection part 21 does not detect the facial direction of the driver. The condition of a face part of the driver is for example the position or size of a face part. Due to the above-mentioned control, it is possible to further suppress the drop in the precision of detection of the facial direction of the driver due to a part of the face parts of the driver being hidden in the facial image of the driver.

Note that, the condition of a face part of the driver may be the position and size of the face part. In this case, if the amount of change of a positions and size of a face part of the driver not hidden in the facial image of the driver is a threshold value or less, the driver condition detection part 21 judges that the facial direction of the driver has not changed from before a part of the face parts of the driver was hidden. On the other hand, the driver condition detection part 21 does not detect the facial direction of the driver if at least one of the amounts of change of the position and size of the face part of the driver not hidden in the facial image of the driver is larger than the threshold value.

Figure 7:
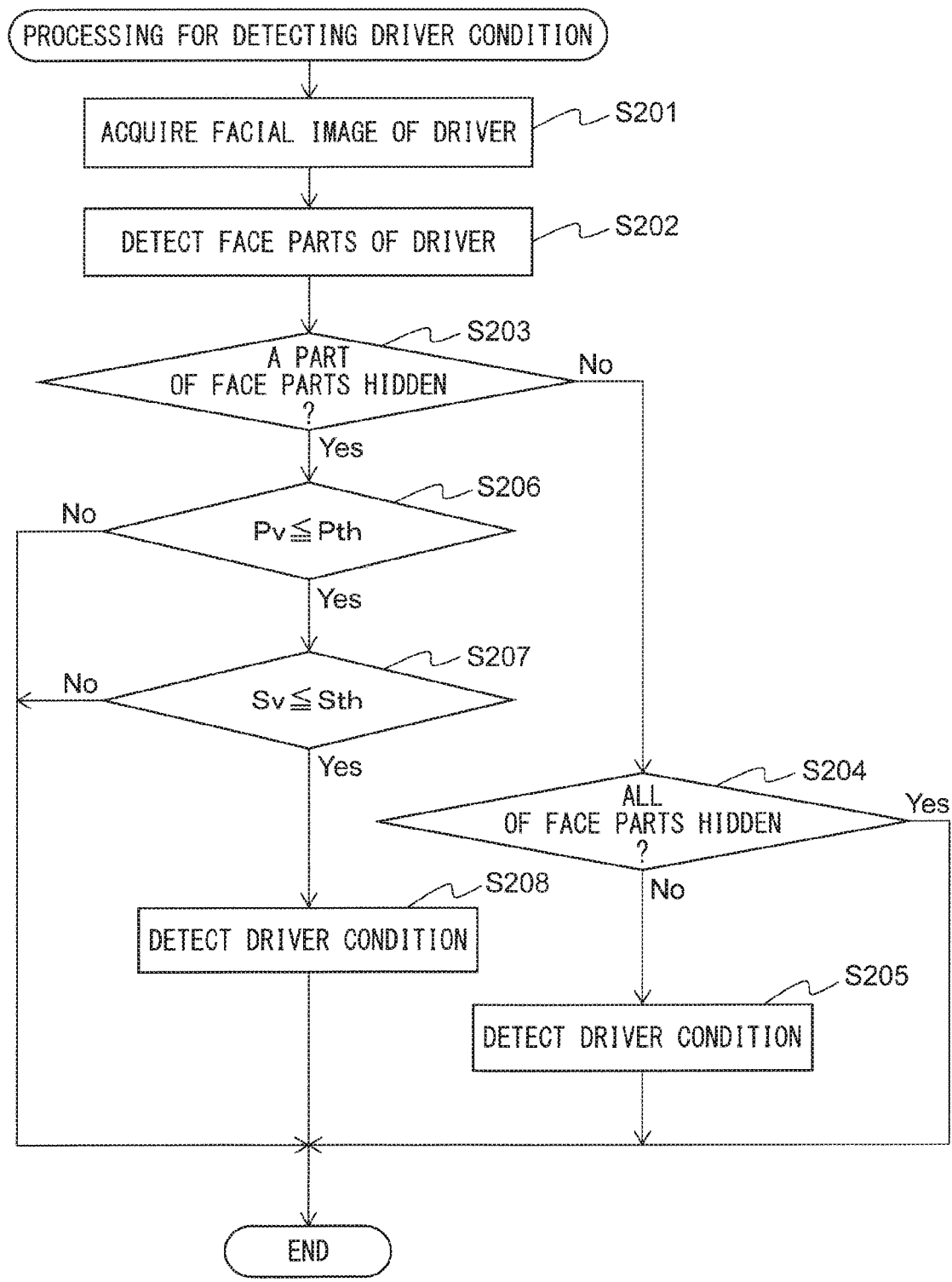
FIG. 7 is a flow chart showing a control routine for processing for detecting a driver condition in a second embodiment.

FIG. 7 is a flow chart showing a control routine for processing for detecting the driver condition in the second embodiment. The present control routine is repeatedly executed by the ECU 20. In the present control routine, the condition of the driver of the vehicle 80 is detected. Step S201 to step S205 are similar to steps S101 to S105 of FIG. 3, so explanations will be omitted.

If at step S203 it is judged that a part of the face parts is hidden, the control routine proceeds to step S206. At step S206, the driver condition detection part 21 judges whether the amount of change Pv of a position of a face part of the driver not hidden in the facial image of the driver is a threshold value Pth or less. The threshold value Pth is set in advance for each face part by experiments or calculation.

If at step S206 it is judged that the amount of change Pv is the threshold value Pth or less, the control routine proceeds to step S207. At step S207, the driver condition detection part 21 judges whether the amount of change Sv of a size of a face part of the driver not hidden in the facial image of the driver is the threshold value Sth or less. The threshold value Sth is set in advance for each face part by experiments or calculation.

If at step S207 it is judged that the amount of change Sv is the threshold value Sth or less, the control routine proceeds to step S208. At step S208, the driver condition detection part 21 detects the driver condition. Specifically, the driver condition detection part 21 detects the facial direction of the driver detected before the face parts of the driver were hidden as the current facial direction of the driver. That is, the driver condition detection part 21 detects the facial direction of the driver detected last at step S205 as the current facial direction of the driver. In other words, the driver condition detection part 21 judges that the facial direction of the driver has not changed from before a part of the face parts of the driver was hidden. Further, the driver condition detection part 21 detects the degree of eye opening of an eye of the driver based on any not hidden eye if at least one of the eyes of the driver is not hidden. After step S208, the present control routine is ended.

On the other hand, if at step S206 it is judged that the amount of change Pv is larger than the threshold value Pth or if at step S207 it is judged that the amount of change Sv is larger than the threshold value Sth, the present control routine is ended. Note that, if at least one eye of the driver is not hidden, after step S206 or after step S207, the driver condition detection part 21 may detect the degree of eye opening of an eye of the driver based on any not hidden eye. Further, in the present control routine, step S206 or step S207 may be omitted.

Above, embodiments according to the present disclosure were explained, but the present disclosure is not limited to these embodiments and can be corrected and changed in various ways within the language of the claims. Further, the above embodiments can be worked in any combination.

The invention claimed is:

1. A driver condition detection system comprising:
   a driver monitor camera capturing a face of a driver of a vehicle and generating a facial image of the driver, and
   a driver condition detection part configured to detect a condition of the driver based on the facial image, wherein:
   when a part of face parts of the driver is hidden in the facial image, the driver condition detection part is configured to detect a condition of the driver based on each of face parts of the driver not hidden in the facial image, the face parts of the driver being a mouth, nose, right eye, and left eye of the driver,
   the condition of the driver is a facial direction of the driver,
   when a part of the face parts of the driver is hidden in the facial image, the driver condition detection part is configured to detect the facial direction of the driver based on the face parts of the driver not hidden in the facial image and the facial image before a part of the face parts of the driver is hidden, and
   the driver condition detection part is configured to judge that the facial direction of the driver has not changed from before a part of the face parts of the driver was hidden when an amount of change of a position and size of the face parts of the driver not hidden in the facial image is a threshold value or less, and not detect the facial direction of the driver when the amount of change of at least one of the position and size is larger than the threshold value.

2. The driver condition detection system according to claim 1, wherein the driver condition detection part is configured to perform matching of the facial image and facial shape data to detect the facial direction of the driver.

3. The driver condition detection system according to claim 2, wherein the driver condition detection part is configured to perform matching of face parts in the facial image and face parts in the facial shape data to detect the facial direction of the driver.

4. The driver condition detection system according to claim 3, wherein the driver condition detection part is configured not to perform matching of the face parts of the driver hidden in the facial image and face parts in the facial shape data when a part of the face parts of the driver is hidden in the facial image.

* * * * *